C. H. KICKLIGHTER.
METHOD OF ELECTRIC WELDING.
APPLICATION FILED AUG. 29, 1914.
1,123,309.
Patented Jan. 5, 1915.
2 SHEETS—SHEET 1.
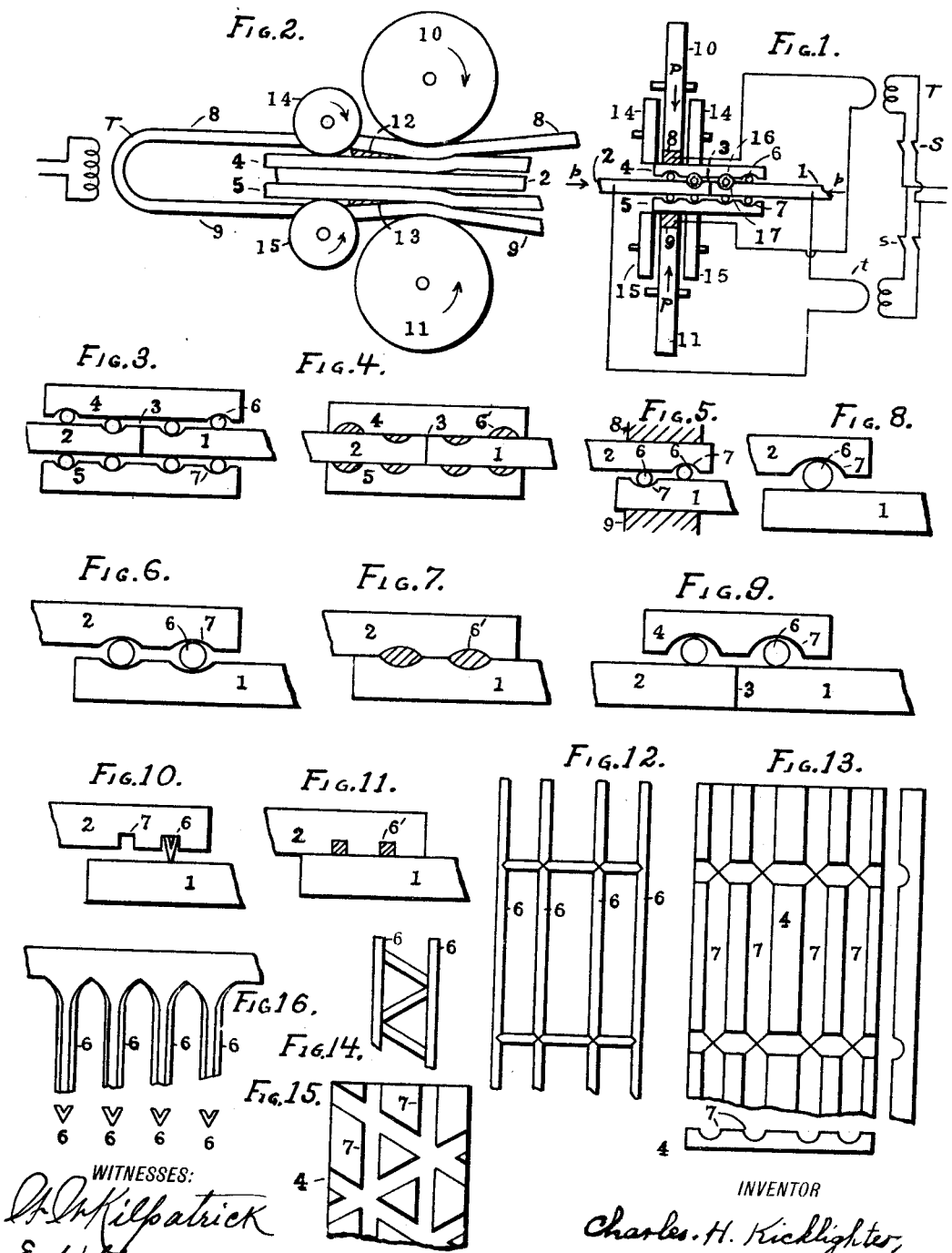
WITNESSES:
INVENTOR
Charles. H. Kicklighter,

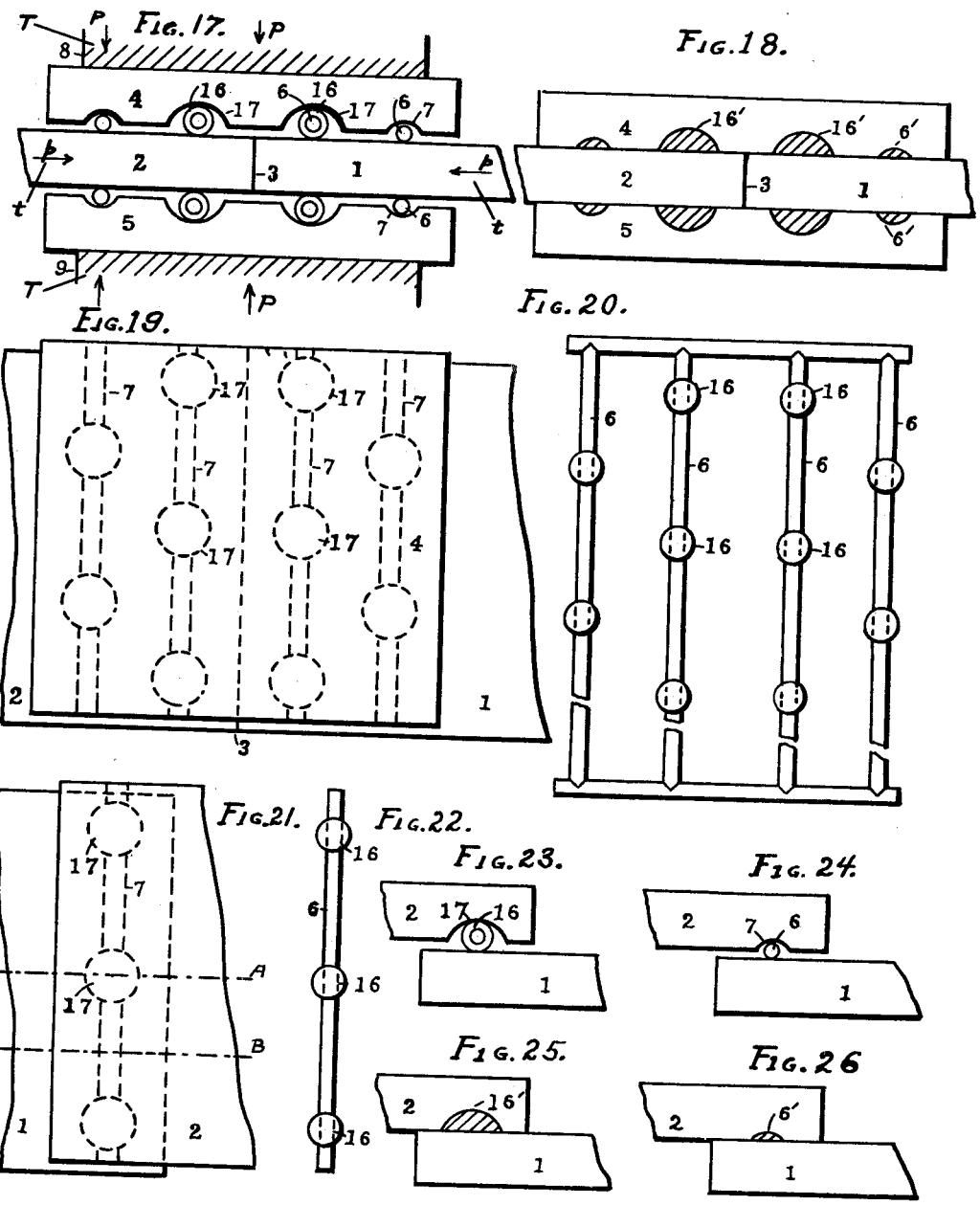

UNITED STATES PATENT OFFICE.

CHARLES H. KICKLIGHTER, OF ATLANTA, GEORGIA.

METHOD OF ELECTRIC WELDING.

1,123,309.        Specification of Letters Patent.        Patented Jan. 5, 1915.

Application filed August 29, 1914. Serial No. 859,195.

*To all whom it may concern:*

Be it known that I, CHARLES H. KICKLIGHTER, a citizen of the United States, residing at Atlanta, in the county of Fulton and State of Georgia, have invented new and useful Improvements in the Method of Electric Welding, of which the following is a specification.

My invention relates to a method of joining two pieces of metal by the use of intermediate metal, which is welded to both of the two pieces and is softened and forced into grooved recesses so as to allow the unwelded faces of the two pieces to come into immediate contact.

The present application is clearly differentiated from applicant's prior application, Serial No. 814,348, in the fact that there exists a different order of process steps.

The order of process steps in the present application is as follows: After the cutting of grooves or depressions in one of the surfaces of desired contact, wires or metal bodies are placed in these grooves or depressions so as to rest on the bottoms thereof and project without the same. The other plate or piece of metal is now brought into contact with the projecting portions of the wires or metal bodies, and the parts subjected to mechanical pressure and heating electric current.

The previous art in electric welding plates has had to do mainly with thin sheet metal. In the electric welding of commercial plates by heavy currents at low voltages, recourse has been had to the simple welding of the edges of the plates, edge to edge,—or in welding in spots usually through the double thickness of a lapped joint. In the edge to edge welding, besides other difficulties, it is troublesome to obtain a joint as strong and reliable as the plate in other places. In the spot welding method, a weld is made through the plate at one small area at a time by pressing on either side thereof the terminals of an electric circuit. In this operation there are several difficulties. Much of the heat is dissipated in the body of the plates. The copper terminals, which of necessity must have a very small area of contact against the plates, are rapidly burned and worn away. Again, the spot welded joint, on account of its lack of continuity, is very apt to leak unless calked or otherwise sealed.

I have made a number of tests on joining metal plates by electric welding, and the above difficulties are in accordance with my experience.

The methods of Rietzel for multiple spot welding and for coupling with a link, having upturned edges, as illustrated in Patents Nos. 928,701 and 1,040,418, respectively, are limited to thin sheet metal work in the practical application in so far as I have been able to learn.

The primary object of this invention is to afford simple and economical means for fastening plates or similar pieces of metal together by the fusing of an intermediate metal to each of the plates or pieces of metal. The intermediate metal should consist of long wires, rods or bars running along the joint between the plates,—and so situated relative to grooved recesses that, as they are fused to the plates, they will also soften and be forced into these recesses so as to permit the unwelded surfaces of the plates to come into immediate contact with each other.

Another object is to afford ample contact between the metal plates and the copper welding terminals, and to eliminate the tendency of these to burn, fuse or wear away on account of heating. And at the same time, the method affords means for confining the greater portion of heat to a very limited area and volume at the place where it can be utilized. The elemination of heat from the plates in large measure prevents trouble due to the distortion of the work during the operation and to the setting up of dangerous stresses afterward. These of course result from the usual heating and subsequent cooling.

Another object is to definitely and positively contract the path of the current to a limited area at the surfaces to be welded. It will be apparent that the use of small pencil-shaped copper terminals does not accomplish this as successfully. It is my opinion that this is because the cross sectional area of the current's path at the surfaces of weld always becomes greater than the contact area of the terminal in the usual case of spot welding. Greater economy of current is obtained for equivalent results by my method. Again, I am enabled to weld plates of such thicknesses that present methods do not apply. I have found that the method of Harmatta, as disclosed in Patent 1,046,066, does not succeed with thick plates because the cross section of current path at the surfaces to be welded becomes so great in thick plates that a sufficient intensity of temperature cannot be obtained. The present method succeeds almost independently of the thicknesses of the plates. Cognizance is herein taken of the method shown by Rietzel of Figure 5, Patent 928,701. But in this case the intermediate metal disks, after the weld is made, hold the plates apart and the method is not suited to boiler and tank construction.

Another object is to afford means for the construction of a butt type of joint much stronger and more reliable than the simple edge to edge weld joint. This, as will be seen, consists in welding over the edge to edge weld one or more straps or welts to strengthen the same and increase the efficiency of the otherwise weak joint.

Still another object is to obtain a type of joint which combines the desirable qualities of continuity of weld, tightness against leakage, great strength, economy of heating current, simplicity of operation, economy of time and expense, and elimination of plate distortion troubles and burning away of welding terminals by concentrating the heat at the point of fusion.

Fig. 1 is a sketch illustrating an end view, partially sectioned and partially diagrammatic. It illustrates one application of the present invention. Fig. 2 is a sketch illustrating a partial side view of the apparatus of Fig. 1. Fig. 3 shows the plates, welts and wires of one type of joint assembled just before the welts are welded on. Fig. 4 shows the joint of Fig. 3 after the welts are welded on. Fig. 5 illustrates the plates and wires in position just before welding up a simple lap joint by use of two wires. Fig. 6 illustrates a slight modification for a joint similar to that in Fig. 5. Fig. 7 illustrates the joint of Fig. 6 after the welding operation. Fig. 8 illustrates the plates and a wire in position before the welding, in which one wire is used. Fig. 9 illustrates the assembly of the welts, plates and wires ready for the reinforcement of the simple butt weld with one welt. Fig. 10 illustrates the plates in position just before welding, in which a stamped bar or rod is employed instead of the wire. Fig. 11 illustrates the joint of Fig. 10 after welding. Fig. 12 illustrates a wire form constructed for use with a welt in Figs. 1, 2, 3 and 4. Fig. 13 illustrates a special grooved welt for use with the wire form of Fig. 12. Fig. 14 illustrates another type of wire form constructed for use as in Fig. 9. Fig. 15 illustrates a grooved welt for use with the wire form of Fig. 14. Fig. 16 illustrates a form stamped from sheet iron and for use in cases similar to Figs. 10 and 11. Fig. 17 shows the plates, welts and wires of Figs. 1 and 2 assembled before the welts are welded on. Fig. 18 shows the joint of Figs. 1, 2 and 17 after the welts are welded on. Fig. 19 is a top view of Fig. 18. Fig. 20 is a wire form with spheres for use in Fig. 17. Fig. 21 is the top view of a simple lapped joint in which the wire and sphere construction is used. Fig. 22 is a wire and sphere for use in Fig. 21. Fig. 23 is a side view taken at A—A of Fig. 21 before welding. Fig. 24 is a side view taken at B—B of Fig. 21 before welding. Fig. 25 is a side view taken at A—A of Fig. 21 after welding. Fig. 26 is a side view taken at B—B of Fig. 21 after welding.

In order that the method may be more clearly understood, reference will be made first to Figs. 1, 2, 3 and 4. Plates 1 and 2 are forced toward each other, edge to edge, by forces $p$—$p$. Switch $s$ is closed so that heavy electric current supplied by transformer $t$, is transmitted between plates 1 and 2 across the line of edges in contact at 3. The heating effect of the electric current, in combination with the mechanical pressure, effects a weld between the abutted edges at 3 of the plates 1 and 2. This part of the operation is old in the art and may be carried out in a number of ways, which it is not deemed necessary to describe here. This part of the operation is incomplete as a satisfactory and strong welding operation. This invention has to do with the completion or satisfactory finishing up of this welding operation. Strips of metal or welts 4 and 5 are introduced into position on either side of the plates 1 and 2 so as to bridge the joint at 3. These welts are held out of actual contact with the plates by wires or bars 6—6, which rest preferably in groves 7—7. These wires or bars may be cylindrical or otherwise shaped. The grooves should be of about the same volume as the wires or bars and of such shape that they will lie loosely therein and project without and above these grooves. The proper conductor bars 8—9 are introduced into contact with the outer surface of the welts 4—5 so that one or more wires 6—6 lie directly between them. Conductor bars 8—9 may be supplied with a heavy welding current by transformer T when switch S is closed. At the same time pressure rollers 10—11 exert force P—P through the conductor bars 8—9 and the welts 4—5 to the wires 6—6. As these pressure rollers 10—11 traverse the joint lengthwise they are immediately followed by a set of blades or wedges 12—13, and a second set of pressure rollers 14—15. The function of the blades is to break contact between the copper conductors 8—9 and the welts 4—5. The function of the pressure rollers 14—15 sage of this current takes place between the rollers 10 and 11. The wires and spheres are simultaneously welded to both welts and to the plate and are forced in their heated and plastic condition into the corresponding grooves and depressions so as to fill the same and allow the welts to come into immediate contact with the plates. The rollers 10—11 traverse the seam from end to end and make a continuous weld as they go. They are followed by blades 12—13 which separate the conductors 8—9 from the welts 4—5, and thus interrupt the current through the completed weld. The blades are not absolutely necessary, as the contact resistance between the copper conductors and the welts varies inversely as the applied mechanical pressure. Thus the flow of current will be very small except under the pressure rollers 10—11. These rollers are followed by another pair of pressure rollers 14—15, bearing directly on the welts 4—5 and holding the heated metal firmly together until the weld is effected.

It is to be understood that the inventor does not limit himself to the herein described means of applying the mechanical pressure and the electric current. It is apparent that pressure blocks, which also serve as electric terminals, may be moved toward each other by rectilinear motion against the welts, and may be moved step by step along the same. Other apparatus may be also employed.

It will be apparent that the percentage of heat developed in the welts and the plate and thus wasted is small, on account of the broad area of path which the electric current has in these. The most of the heat is developed in the wires 6—6 and the spheres 16—16 and especially at the contact surfaces of these with the plates. This is because of the greatly restricted and contracted area of path here afforded the electric current. This is the valuable point of the invention. Nearly every particle of this heat is utilized,—that at the wire and sphere contact surfaces for welding purposes, that in the body of the wires and spheres for making them plastic so that they can be readily forced into the grooves and recesses until the plate surfaces come into immediate contact. It will also be apparent that when the pressure is first applied, theoretically there is but line contact between the wires and the surfaces on either side, and only point contact between the spheres and the surfaces. Due to the intense heat developed at this very restricted path for the current, the welding may actually begin before the body of the wire or sphere begins to soften much, and thus the welding of the wire or sphere to each surface will be from the center outward. The intensest heat will be developed at the center line of the path of weld. In practice it may be found that the volume of the intermediate metal should be slightly more or less than the volume of the voids. However, they should be about the same.

It is also apparent that the herein described method of fastening pieces of metal together is not limited to plates and sheets, but may be applied to beams, angle irons, structural forms, and the like.

What I claim is:

1. The method of fastening two pieces of metal together, face to face, consisting of cutting grooves in the faces of said pieces, of introducing metallic wires or bars into said grooves with a portion of their lateral surfaces projecting without the grooves so as to hold the said pieces of metal apart, of bringing said pieces into the desired juxtaposition, and of welding the wires or bars to both of said pieces of metal by the application of pressure and heating electric current.

2. The method of fastening two pieces of metal together, face to face, consisting of cutting grooves in the faces of said pieces, of introducing metallic wires or bars into said grooves with a portion of their lateral surfaces projecting without the grooves so as to hold the said pieces of metal apart, of bringing said pieces into the desired juxtaposition, and of simultaneously forcing the wires or bars into the voids of the grooves and welding them to both of said pieces of metal by the application of pressure and heating electric current.

3. The method of fastening two pieces of metal together, face to face, consisting of cutting voids from the surfaces of said pieces, of introducing metallic bodies into said voids with a portion thereof resting on the bottom of the voids and a portion thereof projecting without the voids so as to hold the said pieces of metal apart; of bringing said pieces into the desired juxtaposition, and of welding the said metallic bodies to both of said pieces of metal by the application of pressure and heating electric current.

4. The method of fastening two pieces of metal together, face to face, consisting of cutting voids from the surfaces of said pieces, of introducing metallic bodies into said voids with a portion thereof resting on the bottom of the voids and a portion thereof projecting without the voids so as to hold the said pieces of metal apart, of bringing said pieces into the desired juxtaposition and of simultaneously forcing the bodies into conformity with the voids and welding them to both of said pieces of metal by the application of pressure and heating electric current.

5. The method of fastening two pieces of metal together, face to face, consisting of cutting grooves in the faces of said pieces, is to maintain pressure on the welts 4—5 after the passage of the electric current so that a weld may be effected.

Fig. 3 illustrates the assemblage of the plates 1—2, the welts 4—5, with simply the wires 6—6, before being subjected to pressure and the electric welding current.

Fig. 4 illustrates the welded joint after the operation on both sides of the butt weld 3. The metal composing the wires 6—6 has been welded to both welts and plates and simultaneously forced and packed into the grooves 7—7 until the surfaces of plates and welts come into immediate contact.

Fig. 5 illustrates a lapped joint between two plates 1—2, in which two wires 6—6 are employed. In each plate is milled one slot 7—7. The pressure blocks 8—9 also serve as terminals for applying the heating current.

Fig. 6 illustrates a lapped joint between two plates 1—2, similar to that of Fig. 5, except that half the volume of the wire is milled from each plate instead of the whole from one plate.

Fig. 7 shows the joint of Fig. 6 after the welding operation. This is theoretically good, but may be difficult in some construction, on account of the trouble in getting the slots in the two plates directly opposite.

Fig. 8 illustrates a simple lapped joint between two plates in which one wire is employed. As this joint may be rather weak, occasional rivets may be used through the lap to strengthen it.

Fig. 9 illustrates a butt joint in which the plates are brought together edge to edge, and a welt or strip is fastened to each of the plates by the method herein described.

Instead of the use of independent wires, a frame work of wire may be used and slots cut into a welt to correspond with this frame. Fig. 12 illustrates four parallel wires connected by cross wires. Fig. 13 illustrates the welt to be used in conjunction with this when making a joint similar to that in Figs. 3 and 4.

Fig. 14 illustrates two parallel wires connected by two diagonal cross wires. Fig. 15 illustrates the welt to be used in conjunction with this, in making a joint similar to that in Fig. 9.

It is evident that stamped frames of thin sheet metal may be used. Fig. 16 illustrates four bars 6—6—6—6 which have been stamped from thin sheet metal and given a V or U shape. These may be inserted in grooves as 7 of Fig. 10. The spring between the forks of bars 6 will serve to hold them in the slots and thus facilitate handling. After the weld has been made the joint will appear as in Fig. 11.

Fig. 17 illustrates the joint of Figs. 1 and 2, and one similar to Figs. 3 and 4 except that small lugs of metal 16—16, preferably in the shape of spheres, have been strung on the wires 6—6. Cup-shaped depressions 17—17 have been cut from the surfaces in contact, preferably from the welt. These depressions may be cut partly from both surfaces. Their function relative to the spheres 16—16 is the same as that of the grooves 7—7 relative to the wires 6—6.

Fig. 19 illustrates the welt 4 of Fig. 17 in place, spanning the butt weld 3 between the plates 1 and 2. Cup-shaped depressions 17—17 and grooves 7—7 have been cut from the welts.

Fig. 20 illustrates the wire frame 6—6 with spheres 16—16 movable thereon. These frames are introduced between the plates 1 and 2 and the welts 4—5, care being taken to slip the spheres along until each falls in a corresponding depression. If the spacing of depressions 17—17 is carefully made to a definite distance, spheres 16—16 may be fixed relative to wires 6—6.

After the plates, welts, wires and spheres as assembled in Fig. 17 are subjected to pressure and heating electric current, the completed welded joint is made as illustrated in Fig. 18. The spheres have been welded to both plates and welts and forced while in the plastic condition into the voids made by the depressions. The wires have been welded to both plates and welts and forced while in the plastic condition into the voids made by the grooves.

Fig. 21 illustrates a simple lapped joint made by welding to both plates an intermediate metal forced into voids between the plates.

Fig. 22 shows the wire with the spheres 16—16, which are used in the joint of Fig. 21.

Figs. 23 and 24 illustrate the relative positions of plates at A—A and B—B, respectively, of Fig. 21 before the weld. Figs. 25 and 26 represent the same positions after the weld.

The operation is as follows: Referring to Figs. 1, 2, 17 and 18, plates 1 and 2 are forced into contact edge to edge by forces p—p, switch s is closed and electric current from transformer t passed between plates 1 and 2 across the resistance of contact 3. The metal of the plate edges is welded at 3, by the simultaneous heating and mechanical pressure. The application of the forces p—p and electric terminals from transformer t are moved along the joint from end to end as the operation proceeds, so as to obtain a continuous butt weld. The wires 6—6, spheres 16—16, the welts 4—5 and electric conductors 8—9 are now brought into proper place. The switch S to transformer T is now closed. Heavy heating and welding current now flows between conductors 8—9 through welts 4—5, wires 6 or spheres 16, and the plate 2 or 1. The pasof introducing metallic wires or bars into said grooves with a portion of their lateral surfaces projecting without the grooves so as to hold the said pieces of metal apart, of bringing said pieces into the desired juxtaposition, of forcing by a gradual and continuous process portions of the electrically heated wires or bars into the voids of the grooves, and of welding said portions to both of said pieces of metal by the application of pressure and heating electric current.

6. The method of fastening metal plates, edge to edge, consisting of cutting voids in the surfaces or a surface of desired contact, of introducing metallic bodies in the voids, of bridging their line of division by a strip running along and in the direction of said line of division, and by the application of pressure and electric heating current of welding said metallic bodies to said strip and plates, and at the same time forcing them into the voids.

7. The method of fastening metal plates, edge to edge, consisting of cutting voids in the surfaces or a surface of desired contact, of introducing metallic bodies in the voids, of bridging their line of division by strips running along and in the direction of said line of division and on both sides of the plates, and by the application of pressure and electric heating current of welding the said metallic bodies to said strips and plates and at the same time forcing them down into the voids.

8. The method of fastening two metal plates by one or more auxiliary plates, consisting in cutting grooves in said auxiliary plate or plates, in introducing wires or bars in the grooves, in bringing the parts into the desired juxtaposition with the grooves parallel to the edges of the main plates and in welding the said wires or bars to the main and to the auxiliary plates by the application of pressure and heating electric current.

9. The method of fastening two pieces of metal together, face to face, consisting of cutting voids from the surface of one of said pieces, of introducing metallic bodies into said voids with a portion thereof resting on the bottom of the voids and a portion thereof projecting without the voids so as to hold the said pieces of metal apart, of bringing said pieces into the desired juxtaposition, and of welding the metallic bodies to both of said pieces of metal by the application of pressure and heating electric current.

10. The method of fastening two pieces of metal together, face to face, consisting of cutting a groove in the face of one of said pieces, of introducing a metallic wire or bar into said groove with a portion of the lateral surface projecting without the groove so as to hold the said pieces of metal apart, of bringing the said pieces into the desired juxtaposition, and of welding the wire or bar to both of said pieces of metal by the application of pressure and heating electric current.

11. The method of fastening two pieces of metal together, face to face, consisting of cutting a groove or grooves in the face or faces of one or more of said pieces of metal, of introducing metallic wires or bars into said grooves with a portion of their lateral surfaces projecting without the grooves so as to hold the said pieces of metal apart, of bringing said pieces into the desired juxtaposition, of forcing by a gradual and continuous process pressure from end to end of said seam portions of the electrically heated wires or bars into the voids of the groove, and of welding said portion to both of said pieces of metal by the application of pressure and heating electric current.

12. The method of fastening two metal plates together, face to face, consisting of cutting voids from the surface of one of said plates, of introducing metallic bodies into said voids, with a portion thereof resting on the bottom of the voids and a portion thereof projecting without the voids, of bringing the other of said plates into contact with said projecting portions of said metallic bodies, and of welding the metallic bodies to both of said plates by the application of pressure and heating electric current.

13. The method of fastening two metal plates together, face to face, consisting of cutting a groove or grooves in the face of one of said plates running in the same direction as the edge thereof, of introducing a metallic wire or wires into said groove or grooves, with a portion of the lateral surface thereof projecting without the groove or grooves, of bringing the other of said plates into contact with said projecting portions of said metallic wire or wires, and of welding the wire or wires to both of said plates by the application of pressure and heating electric current.

14. The method of fastening two metal plates together, face to face, consisting of cutting a groove or grooves in the face of one of said plates running in the same direction as the edge thereof, of introducing a metallic wire or wires into said groove or grooves, with a portion of the lateral surface thereof projecting without the groove or grooves, of bringing the other of said plates into contact with said projecting portions of said metallic wire or wires, of forcing portions of the electrically heated wire or wires into the voids of the groove or grooves, and of simultaneously welding said portions to both of said plates by the application of pressure and heating electric current.

15. The method of fastening two metal plates together, face to face, consisting of cutting a groove or grooves in the face of one of said plates running in the same direction as the edge thereof, of introducing a metallic wire or wires into said groove or grooves, with a portion of the lateral surface thereof projecting without the groove or grooves, of bringing the other of said plates into contact with said projecting portions of said metallic wire or wires, of forcing by a gradual and continuous process along the seam portions of the electrically heated wire or wires into the voids of the groove or grooves, and of welding said portions to both of said plates by the application of pressure and heating electric current.

In testimony whereof, I have hereunto signed my name in the presence of two subscribing witnesses at Atlanta, in the county of Fulton and State of Georgia, this 21st day of August 1914.

CHARLES H. KICKLIGHTER.

Witnesses:
  N. H. COLLINS,
  J. E. MEDLOCK.

Copies of this patent may be obtained for five cents each, by addressing the "Commissioner of Patents, Washington, D. C."